W. C. BAKER.
Valve for Steam-Radiators.
No. 167,211. Patented Aug. 31, 1875.
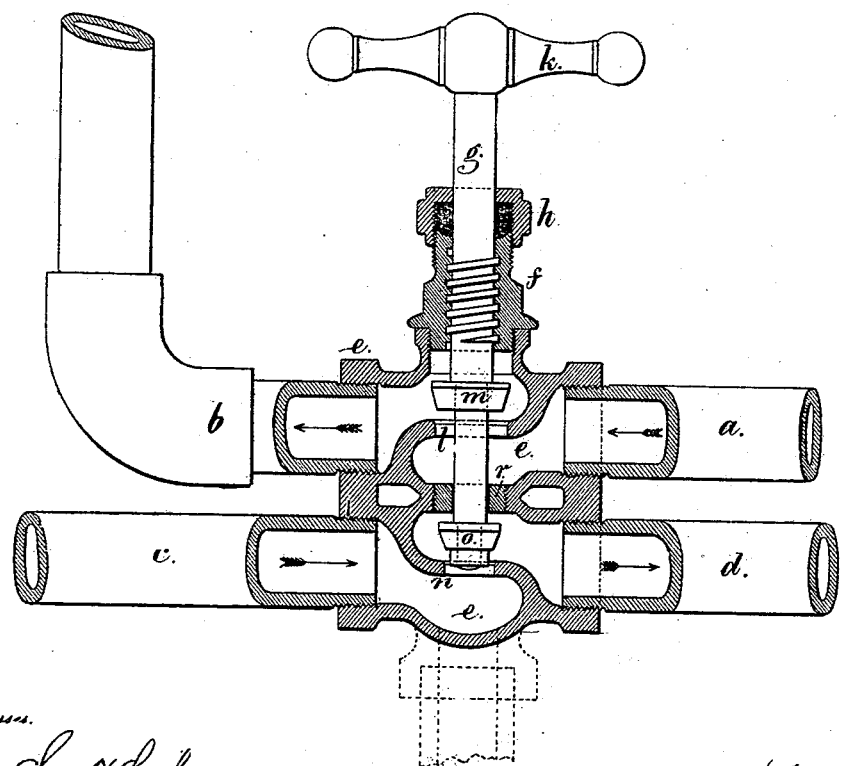

UNITED STATES PATENT OFFICE.

WILLIAM C. BAKER, OF NEW YORK, N. Y.

IMPROVEMENT IN VALVES FOR STEAM-RADIATORS.

Specification forming part of Letters Patent No. 167,211, dated August 31, 1875; application filed March 21, 1873.

*To all whom it may concern:*

Be it known that I, WILLIAM C. BAKER, of the city and State of New York, have invented an Improvement in Valves for Steam-Radiators, of which the following is a specification:

In steam-radiators it is usual to employ two valves—one to admit steam, the other to open or close the return-pipe for the water of condensation. If these valves are not opened or closed at about the same time the steam either passes in and condenses when the delivery-pipe is closed, and an accumulation of water results, or else, with the steam-valve closed and the water-valve open, the water of condensation from other parts of the apparatus, or the water from the boiler, ascends into the radiator, in consequence of a vacuum action or difference of pressure. In either case inconvenience or injury results. Sometimes the water in the radiator freezes, and very often a noise is caused by the water, greatly annoying and sometimes frightening persons near by.

My invention is made for overcoming these difficulties by means of a double-acting valve, that opens or closes the respective steam and water pipes simultaneously.

In the drawing I have represented the improvement by a vertical section of the said valve and its connecting-pipes. The pipe $a$ supplies steam, the pipe $b$ leads to the coil or radiator, the pipe $c$ receives the water of condensation, and pipe $d$ conveys the same to the boiler or tank. The body $e$ of the cock is made with the necessary hubs or couplings for these pipes, and also with a screw-socket for the head $f$, through which head the screw-valve stem $g$ passes, as usual. The cap $h$ retains the packing for the stem $g$, and $k$ is the hand-wheel or handle. The diaphragm $l$ separates the steam-passages, and in it is an opening and seat for the valve $m$, and the diaphragm $n$ separates the water-passages, and contains an opening and seat for the valve $o$. These parts are so constructed and positioned that both valves will be pressed upon or raised from the seats simultaneously by their spindle, and open or close the steam and water ways.

In order to introduce the valve $o$ conveniently I make use of a disk, $r$, screwed into the partition between the respective seats; this allows for easily fitting and grinding in the valves before the disk is put into its place. I remark that, if desired, one or both of the valves may be provided with a spring between a shoulder upon the stem and the upper surface of the valve, to allow for variations of wear or expansion of the metal. A saucer-shaped spring is preferable.

The pipe $c$ might be screwed to the body $e$ at the bottom, as shown by dotted lines, in which case the connections will be made so that the pipe $d$ receives the water of condensation from the coil or radiator, or the connections may be arranged in any other convenient manner.

I claim as my invention—

1. The valve-body $e$, provided with connections for the four pipes $a$, $b$, $c$, and $d$, and with the diaphragms $l$ and $n$ and valve-seats, in combination with the valves $m$ and $o$ upon the stem $g$, substantially as and for the purposes set forth.

2. The steam and water pipes of a steam-radiator, contiguous to each other and connected to one double-acting cock or valve, to open or close such pipes simultaneously by one movement, substantially as and for the purposes set forth.

Signed by me this 17th day of March, A. D. 1873.

W. C. BAKER.

Witnesses:
 GEO. T. PINCKNEY,
 CHAS. H. SMITH.